United States Patent [19]

Hakimi

[11] Patent Number: 5,432,637
[45] Date of Patent: Jul. 11, 1995

[54] FIBER OPTIC DEPOLARIZER FOR OPTICAL TIME DOMAIN REFLECTOMETER AND FIBER OPTICAL COMMUNICATION SYSTEMS

[76] Inventor: Farhad Hakimi, 131 Coolidge Ave., #627, Watertown, Mass. 02172

[21] Appl. No.: 259,076

[22] Filed: Jun. 13, 1994

[51] Int. Cl.6 .............................................. G02B 5/30
[52] U.S. Cl. ....................... 359/497; 385/11; 385/31
[58] Field of Search ............ 385/11, 15, 27, 28, 385/31, 33, 39; 359/494, 497, 499

[56] References Cited

U.S. PATENT DOCUMENTS

| | | | |
|---|---|---|---|
| 4,746,184 | 5/1988 | Gäng | 385/15 |
| 4,968,112 | 11/1990 | Lovely et al. | 385/11 |
| 5,136,667 | 8/1992 | Ohno et al. | 385/11 |
| 5,257,329 | 10/1993 | Blyler et al. | 385/11 |
| 5,335,064 | 8/1994 | Nishiura et al. | 385/11 X |

Primary Examiner—John D. Lee

[57] ABSTRACT

Apparatus for depolarizing light in fiber optics, comprises of a pair of fiber optic collimators and plurality of contiguous slabs of linear birefringent plates arranged in a stack forming a parallel slab. The optical axes of said linear birefringent plates are approximately 45 degrees with respect to each other. Thicknesses of said linear birefringent plates are such that their individual polarization mode delays exceed coherence time of a beam defined by an optical source.

2 Claims, 1 Drawing Sheet

FIBER OPTIC DEPOLARIZER FOR OPTICAL TIME DOMAIN REFLECTOMETER AND FIBER OPTICAL COMMUNICATION SYSTEMS

BACKGROUND OF THE INVENTION

The present invention relates to a fiber optical depolarizer which converts a polarized beam to an unpolarized beam.

One of the major applications of single-mode fibers concerns telecommunications, particularly, for trunk networks, where long-haul high-data-rate links predominate. These links can take full advantage of the very high data rate offered by single-mode fibers on long lengths. Millions of kilometers of single-mode optical fibers are already installed throughout the world. With so much fiber installed and more to be manufactured, two issues have become paramount in fiber telecommunication. First, precise and nondestructive measurements, testings, and diagnosis of installed and manufactured fibers. Second, optical noise control in fiber cables. It is an object of the present invention to address both issues, namely, to provide improvement on nondestructive fiber measurement and reduce polarization noise in the fiber optic links.

Light sources utilized in telecommunication are highly polarized (pigtailed diode lasers). If spectrally narrow, polarized radiation is launched into a single mode fiber, a high degree of polarization is observed at a far end of the fiber, even for fiber length of tens of kilometers. The state of polarization (SOP), however, can vary considerably due to wavelength variations of the laser, or fluctuations of the birefringence or polarization coupling because of varying environmental conditions such as temperature or mechanical movements. If elements with polarization-dependent loss are inserted in a single mode fiber line, fluctuations of the SOP give rise to the polarization intensity noise (polarization ripples). The polarization intensity noise degrades the communication link fidelity and demotes the diagnosis of optical cables. The polarization noise can be reduced by placing a depolarizer in front of the laser source. Any element in the fiber optic link which is polarization sensitive requires a depolarizer before and preferably after that element in order to reduce polarization noise in communication links. Some optical detectors are polarization sensitive and require a depolarizer to be placed before them.

As mentioned previously, the polarization noise has to be addressed for accurate measurement of fibers. The present invention reduces artifacts in optical fiber measurements, associated with the polarization noise. The backscattered technique is an elegant method to diagnose transmission characteristics of optical fibers. The backscattering technique is called the optical time domain reflectometer (OTDR). The OTDR has many advantages such as nondestructive measurements of fiber attenuation, spatial inhomogeneities, insertion loss of optical connectors, and splice loss. In the conventional OTDR a light pulse is input into a coupler and the output of coupler is launched into an optical fiber under tests. Light is continuously Rayleigh scattered as it propagates down the fiber, and some of the scattered light is recaptured in the backward direction through the fiber. The backscattered light reaches the optical detector via said coupler. The conventional backscatter technique (OTDR) makes use of intensity information decaying exponentially with time. Light sources used in the conventional OTDR are highly polarized (pigtailed diode lasers). When polarized radiation is launched into a single mode fiber, a high degree of polarization is observed at a far end of the fiber. The Rayleigh backscattered light from the fiber under test preserves the state-of-polarization of the probe light at scattering centers. The scattering signal from the fiber will therefore be polarized. The state of polarization (SOP), however, can vary considerably due to environmental conditions such as temperature or mechanical movements. If elements with polarization-dependent loss are inserted in a single mode fiber line, fluctuations of the SOP give rise to the polarization intensity noise (polarization ripples). The polarization intensity noise masks the local attenuation information in the backscattered signal and, therefore, reduce the usefulness of the OTDR technique. Consequently, a fiber optic depolarizer becomes an essential tool to alleviate the polarization noise problem in the OTDR.

Couplers, fusion splices, connectors and bends can potentially introduce polarization sensitivity whether they are inside or outside the OTDR. Therefore, to reduce polarization sensitivity due to the internal polarization sensitive components, the light source has to be depolarized when leaving the OTDR. Depolarized light leaving the OTDR will be partially polarized by polarization dependent components in the fiber under test. Preferably, the returning partially polarized light has to be depolarized again in order to improve the measurement process.

A polarized light has a definite phase relationship between its two orthogonal eigenstates. To depolarize a light beam, the phase relation between the two eigenstates has to be destroyed. This can be accomplished by introducing a time delay between the two eigenstates more than the coherence time of the source in a such way that the light beam has equal amplitudes in its two eigenpolarizations. Therefore, a totally depolarized light has equal exaltations in its eigenstates with no phase coherence between them. A typical laser diode used in a commercial OTDR, has 8 nm bandwidth with 1 ps coherence time. A quartz birefringent plate, for example, introduces approximately 0.025 picasecond polarization mode delay par millimeter. Therefore, a linearly polarized light of 8 nm bandwidth, launched at 45 degrees with respect to the optical axis, requires a minimum of 40 millimeter of a quartz birefringent plate to depolarize.

The issue of polarization sensitivity in OTDR was recognized by Martin P. Gold, "Design of a Long-Range Single-Mode OTDR", IEEE Journal of Lightwave Technology LT-3, page 39 (1985). In his publication, he proposes scrambling of the state of polarization for the return path of the OTDR.

Brinkmeyer and Streckert, "Reduction of Polarization Sensitivity of OTDR for Single-Mode Fibers", IEEE Journal of Lightwave Technology, LT-4, page 513 (1986) explore use of a birefringent fiber to depolarize the laser source.

Use of a birefringent fiber to depolarize has also been discussed in a paper by T. Hodguchi, K. Suzuki, N. Shibata, and S. Seikai, "Birefringent Launching Fibers for Reducing Backscattered Power Fluctuations in Polarization-Sensitive Optical Time Domain Reflectometer", Journal of Optical Society America A 2, page 1698 (1985). Horiguchi et al and Brinkmeyer et al methods of depolarization require a known linearly polarized light; it fails in a case of general elliptic polarized light with arbitrary orientation.

P. S. Lovely, L. McCaughan, and E. B. Osgood, "Apparatus for Providing Depolarized Light", U.S. Pat. No. 4,968,112, describe a birefringent waveguide to depolarize light. Their device requires pigtailing of a waveguide to a single mode fiber. Fiber pigtails are polarization sensitive, hence, defeating the depolarization capability of the apparatus. In addition, it has an unattractive feature of requiring a polarization controller for the input radiation.

Lee L. Blyler, Jr, Robert W. Filas, and Gary J. Grimes, "Depolarization of Light in an Optical Switching Systems", U.S. Pat. No. 5,257,329, utilize microparticles of refractive or diffractive nature in a core of optical fiber to scatter light and cause depolarization. Disadvantage of such a method is high loss due to scattering from microparticles.

Advantages of the present invention over the discussed prior arts are the followings. The present invention works regardless of the state of polarization of the input light and does not require a polarization controller or specific alignments of the optical polarization axes. Unlike others, the present invention offers a flexibility of placing the depolarizer after the OTDR light source or before the fiber under tests. It has low insertion loss (less than 0.5 dB).

SUMMARY OF THE INVENTION

It is accordingly a primary object of the present invention to provide a fiber optic depolarizer to overcome undesirable effects of the polarization intensity noise in the OTDR and fiber optical communication systems.

The above objective is attained by a depolarizer comprising a first optical fiber and collimating optics, a plurality of contiguous linear birefringent plates coupled with the output of said collimating optics, wherein each birefringent plate is long enough to satisfy $tn > tc$ where $tn$ is the polarization mode delay in said nth birefringent plate, $tc$ is coherence time of an optical beam defined by an optical source, and the angle between polarization axes of consecutive said plates is approximately 45 degrees, and a focusing optics coupled with the output of said contiguous plates, and a second optical fiber coupled with the output of said focusing optics.

DETAILED DESCRIPTION

Figure 1:
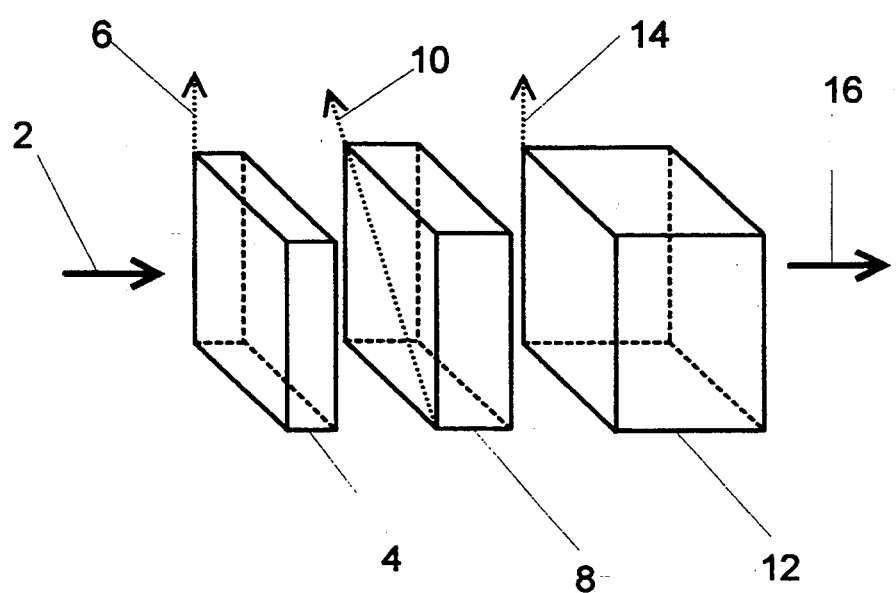
FIG. 1 schematically illustrates a fiber optic depolarizer constructed in accordance with the principles of the present invention.

The depolarizer illustrated in FIG. 1 comprises an optical fiber 2 that carries an input optical radiation. Light exiting the core of said fiber is collimated by an optical element 4 into a beam 6. Axial direction of the light beam is indicated by arrow 6. The collimated beam 6 passes through linear birefringent plates 8 and 14 and is turned into a collimated beam 16. The collimated beam 16 is focused by an element 18 into an output optical fiber 20.

The propagation velocity of light is slightly different along the optical axis than perpendicular to the axis. The difference in propagation velocity is approximately 0.025 picasecond per millimeter in the case of quartz crystal. The optical axis 10 of birefringent plate 8 is approximately 45 degrees from the optical axis 12 of birefringent plate 14. In order to destroy phase coherence of an input optical radiation, the length of elements 8 and 14 are selected so that the polarization mode delays in said birefringent elements exceed the coherence time of light in the input fiber 2. In a particular implementation, in which light in the fiber 2 has 8 nm bandwidth, a minimum length of 40 mm quartz crystal is required for all said birefringent plates to destroy the phase coherence of the input light. The reason for the need of more than one birefringent plate is as follows. If the collimated light 6 happen to be linearly polarized and is aligned along one of principal axes of the first birefringent plate, then no polarization mode delay will take place between two of the eigenmodes, hence, no depolarization is achieved. However, a second crystal whose principal axes are 45 degrees from the first crystal will depolarize the output of the first crystal provided it is long enough.

What is claimed is:

1. A fiber optic depolarizer for providing depolarized light for the OTDR and fiber optic communication systems comprising:
   a plurality of at least three contiguous linear birefringent elements arranged in succession,
   wherein $tn > tc$ is satisfied where $tn$ is the polarization mode delay in nth linear birefringent element, $tc$ is coherence time of a beam defined by an optical source.

2. A fiber optic depolarizer for providing depolarized light for the OTDR and fiber optic communication systems comprising:
   a plurality of at least three contiguous linear birefringent elements arranged in succession,
   wherein $tn > tc$ is satisfied where $tn$ is the polarization mode delay in nth linear birefringent element, $tc$ is coherence time of a beam defined by an optical source, and the angles between the principal axes of any two adjacent said birefringent elements are approximately 45 degrees.

* * * * *